United States Patent [19]

Adams

[11] Patent Number: 4,846,686
[45] Date of Patent: Jul. 11, 1989

[54] MOTOR VEHICLE SIMULATOR WITH MULTIPLE IMAGES

[75] Inventor: Warren K. Adams, Endwell, N.Y.

[73] Assignee: Doron Precision Systems, Inc., Binghamton, N.Y.

[21] Appl. No.: 9,737

[22] Filed: Feb. 2, 1987

[51] Int. Cl.[4] .................................................. G09B 9/04
[52] U.S. Cl. ...................................................... 434/69
[58] Field of Search ....................... 434/61, 62, 69, 70; 358/104; 364/578

[56] References Cited

U.S. PATENT DOCUMENTS

| | | | |
|---|---|---|---|
| 2,935,794 | 5/1960 | Durham | 434/69 |
| 3,205,592 | 9/1965 | Wood, Jr. | 434/69 |
| 3,488,861 | 7/1970 | Jones et al. | 434/69 |
| 3,833,759 | 9/1974 | Yatabe et al. | 434/69 |
| 3,898,746 | 8/1975 | Seidle | 434/69 |
| 4,196,528 | 4/1980 | Foerst | 364/578 X |

FOREIGN PATENT DOCUMENTS 678500  8/1979  U.S.S.R. ................................ 434/69

*Primary Examiner*—Richard J. Apley
*Assistant Examiner*—Robert W. Bahr
*Attorney, Agent, or Firm*—Richard G. Stephens

[57] ABSTRACT

The driver training simulator system of the present invention includes a visual display system and a student station. The student station has simulated automotive control elements such as a steering wheel, brake pedal, accelerator pedal, etc. The visual display system includes an arrangement for presenting images to the student, for example it may include a motion picture projector and an associated display screen. The images which are presented to the student include a plurality of separate sections. Each of the separate sections of the image is recorded by a separate camera. One of the sections of the image presented to the student is a conventional front looking "driver point of view" image, that is, the image that a driver would see looking through his front windshield. Another section of the images consists of images that were recorded by one or more cameras which were facing rearward. The student is therefore simultaneously presented with a forward looking "driver point of view image" and with one or more images representing what one would see looking toward the rear of the vehicle. Since these different views were independently filmed, they can be independently edited and arranged to produce the optimum pedagogical effect.

4 Claims, 3 Drawing Sheets

MOTOR VEHICLE SIMULATOR WITH MULTIPLE IMAGES

The present invention relates to motor vehicle drive training and more particularly to simulators for motor vehicle driver training.

BACKGROUND OF THE INVENTION

Driver training simulators are well known. For example see U.S. Pats. Nos. 3,266,173 (Sheridan) and 2,935,794 (Durham). Such simulators normally have a student driver station and a visual display system. The student driver station simulates the controls in a normal vehicle and the visual display system presents images to the student by means of either a video display or a motion picture projector. A series of images are presented to the student simulating the view that a driver would see and the student is asked to operate the controls in the student driver station in response to the images that are presented.

One of the items of concern in the design of driver training simulators is the problem of providing the student with rear view images, that is, images representing or showing what is behind the simulated vehicle. Several techniques are known for providing the student with such rear view images.

In one technique for providing the student with simulated rear view images, the camera which records the forward view is positioned such that its field of view includes an image of what appears in a normal center mounted rear view mirror. Thus, the image presented to the student driver includes an image of what appears in the rear view mirror. This technique can only be effectively used to simulate the view that a driver would see in a center mounted rear view mirror. It can not effectively be used to simulate the view which appears in mirrors placed outside the vehicle's cab such as those normally used in trucks. Among the reasons for this is the fact that the conventional cameras (even if they include an anamorphic lens) do not have a wide enough field of view such that they can simultaneously capture both the front image and the image in two widely separated rear view mirrors.

In another technique for providing the student with a simulated rear view image, a mirror is placed behind the student station. At appropriate times the student is asked to turn his head and look into this mirror. The mirror is positioned so that it gives the student a view of the screen and after the student is asked to turn and lood into the mirror, a reverse image of what is behind the vehicle is projected on the screen. When looking in the mirror the student is therefore given the impression that he is seeing the view that he would see in an actual vehicle if he turned his head to look in a rearward direction. This technique has the disadvantages that (a) the student must be told when to turn his head and (b) there is a period of disorientation when the image on the screen is changed from a front view to a "reverse" image of what the student would see in an actual vehicle if he turned his head. Furthermore, in simulators for large trucks, the driver normally does not observe what is behind the truck by turning his head. In a large truck, the driver normally observes what is behind the truck by looking into large mirrors that are positioned outside the truck cab.

OBJECTS OF THE PRESENT INVENTION

An object of the present invention is to provide an improved motor vehicle driver simulator.

Another object of the present invention is to provide an improved method of presenting rear view images in a motor vehicle driver simulator.

Another object of the present invention is to provide a motor vehicle driver simulator wherein the rear view image which is presented to the student is recorded and projected synchronously with the recording and projection of the forward looking view which is presented to the student.

Another object of the present invention is to provide a motor vehicle driver simulator wherein the rear view images which are presented to the student are filmed synchronously and edited independently from the filming and editing of the forward looking image which are presented to the student.

Still another object of the present invention is to provide an improved training film for use in a driver training simulator.

Yet another object of the present invention is to provide an improved method for making a training film for use in an automotive driver simulator. SUMMARY OF THE INVENTION The driver training simulator system of the present invention includes a visual display system and a student station. The student station has simulated automotive control elements such as a steering wheel, brake pedal, accelerator pedal, etc. The visual display system includes a means of presenting images to the student, for example it may include a motion picture projector and an associated display screen.

In accordance with the present invention the images which are presented to the student include a plurality of separate sections. Each of the separate sections of the image is recorded by a separate camera.

One of the sections of the image presented to the student is a conventional front looking "driver point of view" image, that is, the image that a driver would see looking through his front windshield. Another section of the images consists of images that were recorded by one or more cameras which were facing rearward.

The student is therefore simultaneously presented with a forward looking "driver point of view image" and with one or more images representing what one would see looking toward the rear of the vehicle. Since these different views were independently filmed, they can be independently edited and arranged to produce the optimum pedagogical effect.

The forward and rearward images are recorded by separate cameras operating synchronously. The forward looking and the rearward looking images are recorded and shown synchronously so that the forward and rearward images correspond to the images that would be simultaneously visible to an observer looking in the forward and reverse directions from a moving vehicle.

In an actual automotive vehicle, when a driver uses mirrors to check conditions behind the vehicle, it is quite typical for the driver to move his head slightly to change or increase his field of view. For example a driver might move his head slightly forward as he changes his focus from the front windshield view to the view that appears in an outside rear view mirror. If a single camera recorded both the forward looking view and the view visible in a rear view mirror, one would not capture the change in view caused by motion of the driver's head. With the present invention, the mirror view produced by the rear facing camera can be cropped and edited so that it depicts more than the mirror views that an operator would see from a single head position. Thus, the present invention provides a student with an improved simulation of conditions that exist when operating an actual motor vehicle.

The foregoing and other objects, features and advantages of the invention will be apparent from the following more particular description of preferred embodiments of the invention, as illustrated in the accompanying drawings.

DETAILED DESCRIPTION

Figure 1:
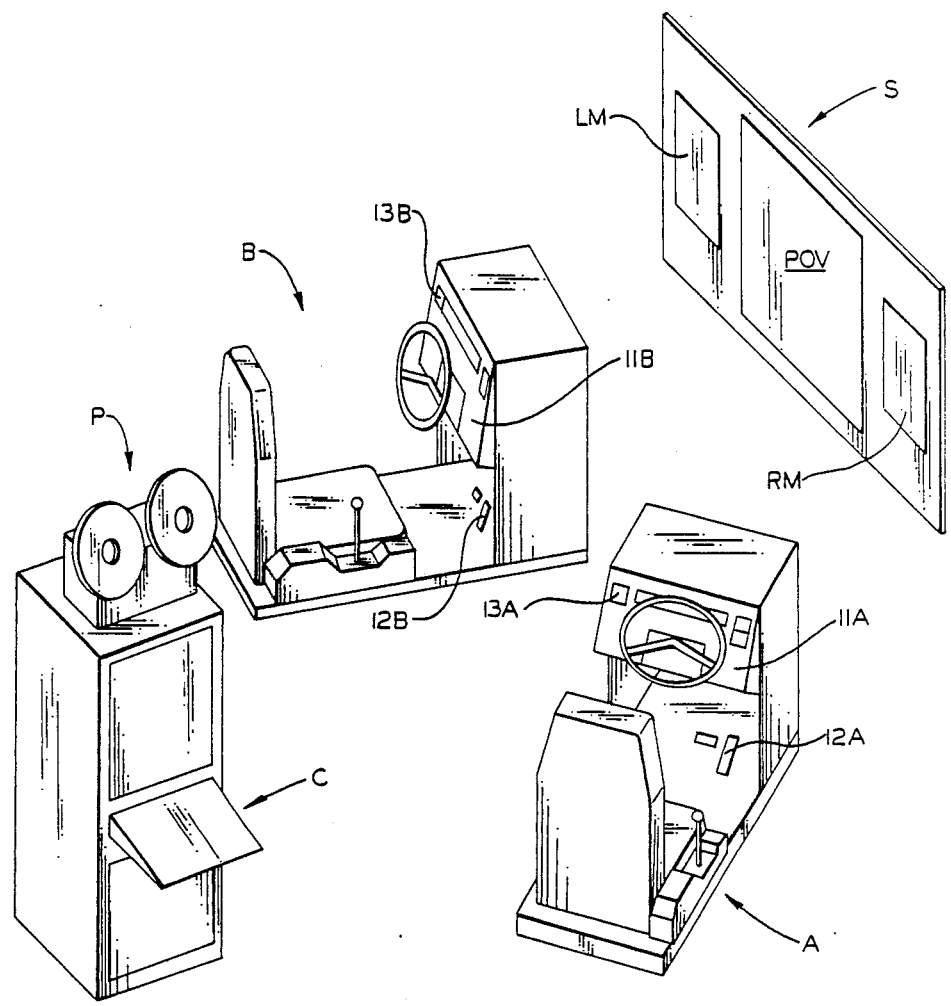
FIG. 1 is a perspective view of the overall system of the present invention.

An overall view of a driver training simulator system built in accordance with the present invention is shown in FIG. 1. It includes two student stations A and B, a screen S and a projector P. Student stations A and B include a plurality of simulated indicators 13A and 13B representing conventional indicators such as a speedometer, a fuel gage, a temperature gage and the like mounted on dashboards 11A and 11B. There are a plurality of control elements 12A and 12B which represent conventional control elements such as an accelerator, a brake pedal and a gear shift lever. The control elements can be operated by the student as he views scenes on screen S. An instructor console C monitors and records student actions.

The screen S includes three images designated LM, POV, and RM which are simultaneously projected thereon by projector P. The center image POV represents the normal forward view that a driver would see when looking forward through the windshield of a vehicle. This is generally termed a "driver point of view" image. The images LM and RM represent the views that a driver would see when looking into his left and right outside rear view mirrors.

Figure 4:
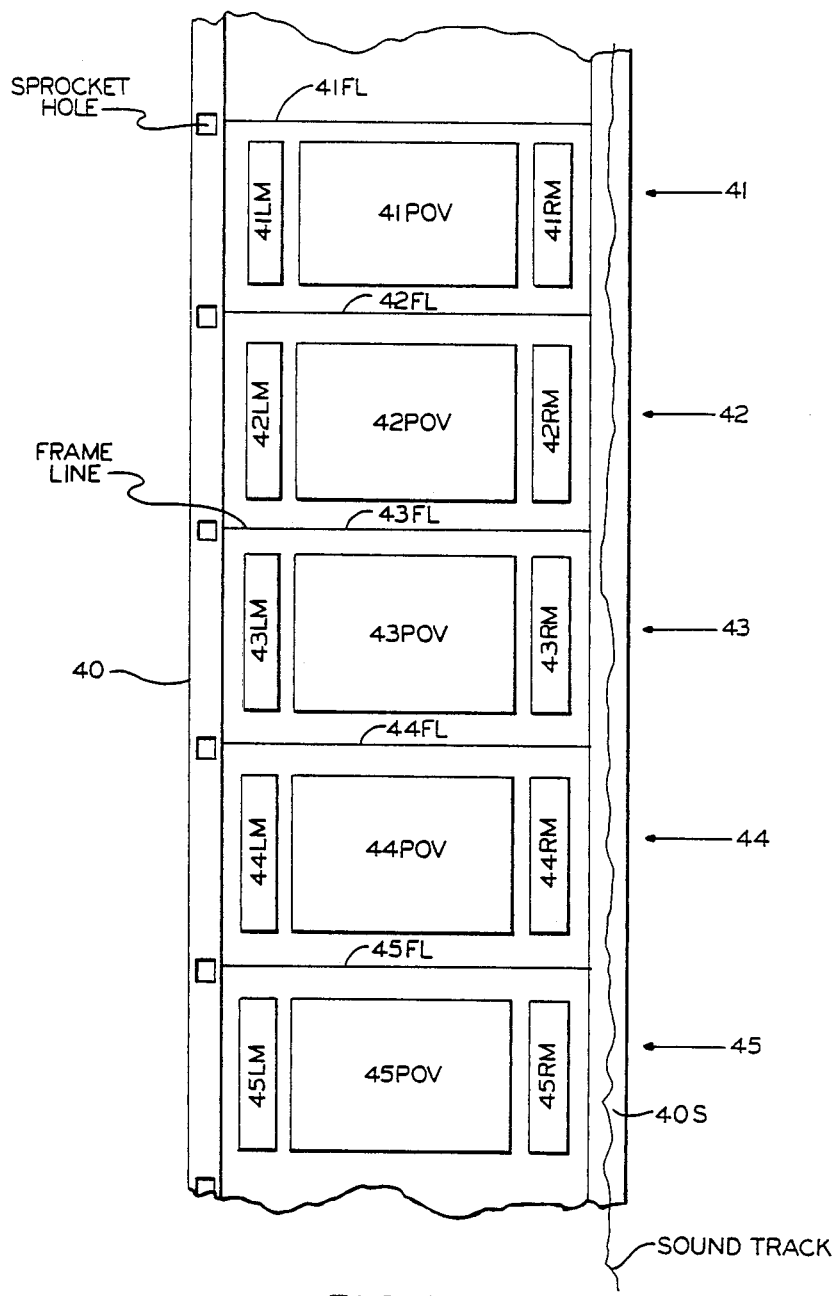
FIG. 4 shows a portion of a film made in accordance with he present invention.

The projector P is a conventional projector with an anamorphic lens. A film 40 such as that shown in FIG. 4 is threaded in projector P. Each frame of the film 40 includes three images. FIG. 4 shows five film frames designated 41, 42, 43, 44 and 45. Each frame includes three images designated 41LM, 41POV, 41RM, 42LM, 42POV, 42RM, etc. Film 40 also includes a sound track 40S.

Figure 2:
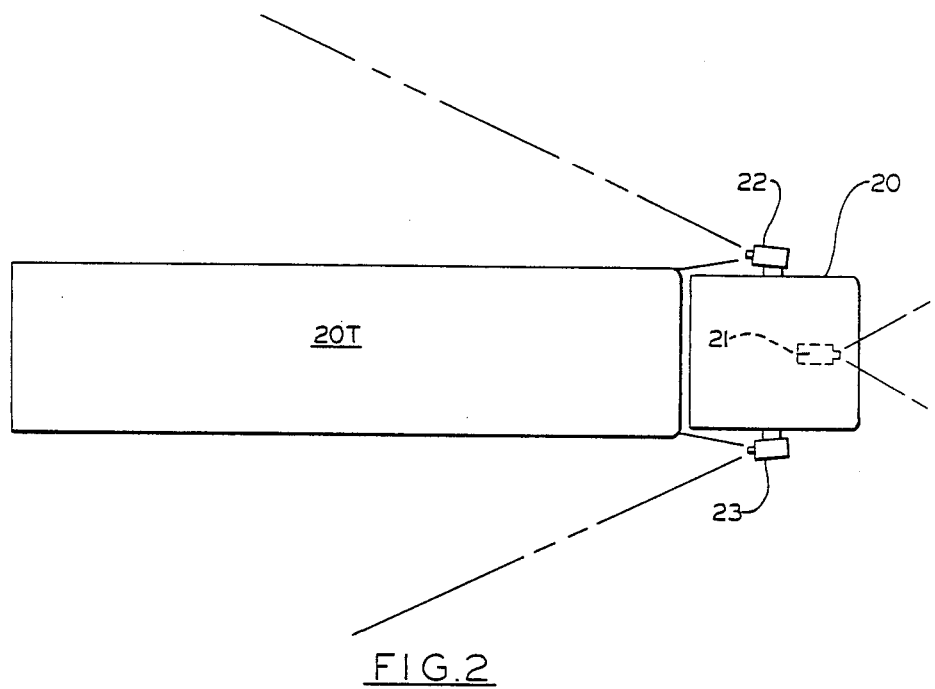
FIG. 2 shows a top view of a vehicle with cameras mounted thereon to produce films according to the present invention.
Figure 3:
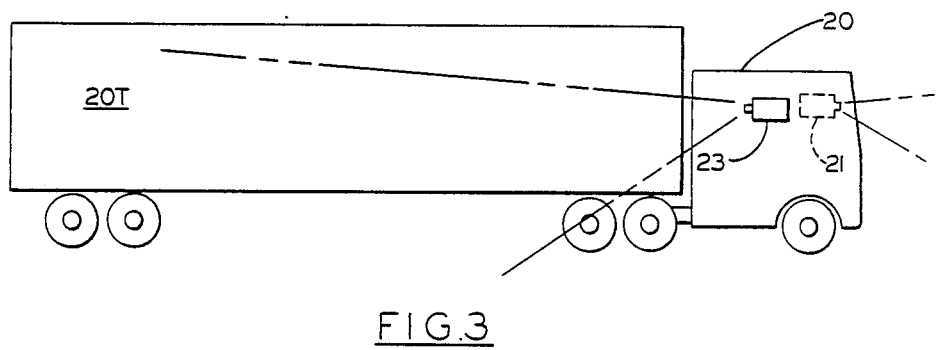
FIG. 3 shows a side view of a vehicle with camera mounted thereon to produce films according to the present invention.

The film 40 is produced from three separate films which were synchronously recorded by three separate cameras, each of which is equipped with a conventional anamorphic lens. FIGS. 2 and 3 show the arrangement used to record the three films that are combined to form film 40. Three cameras each of which has an anamorphic lens (not specifically shown) are mounted on a vehicle 20. A first camera 21 is mounted facing forward to capture the view that a driver would see when looking directly forward. The second and third cameras 22 and 23 are mounted on the outside of the vehicle facing backward. Since they have anamorphic lenses, cameras 22 and 23 capture an image or view that is significantly wider than the view that is visible in a normal mirror.

Using conventional photographic dark room techniques the three films produced by cameras 21, 22 and 23 are combined into a single negative to produce film 40. When producing film 40, the images from cameras 22 and 23 are reverse printed so that when film 40 is projected on screen P, images LM and RM appear as reverse or "mirror" images.

When combining the images from the three cameras 21, 22 and 23 the images maybe cropped and edited to produce the desired pedagogical and visual effects. For example, the films from cameras 22 and 23 can be recorded and projected in selected frame widths to give the student a simulated view of what a driver would see if he moved his head while checking the rear of the vehicle through a rear view mirror. Furthermore when the films from cameras 22 and 23 are projected in such a way that a portion of the side of the truck trailer 20T is included in the image projected, the student will perceive a more realistic feeling that he is in fact observing what would normally appear in a mirror. The fact that the mirror point of view can be projected in a variety of frame widths enables simulation of a driver moving his head as he changes his view from the front of the vehicle to the view that appears in a mirror.

The fact that the three images from cameras 21, 22, and 23 can be independently controlled, gives the film maker a great deal more versatility than he would have in a situation where the rear view image is filmed by a camera that has both the rear view mirror and the front view within its one field of view.

While the invention has been particularly shown and decribed with reference to preferred embodiments thereof, it will be understood by those skilled in the art that the foregoing and other advantages in the form and detail may be made therein without departing from the spirit and scope of the invention.

I claim:

1. An automotive driver training simulator comprising in combination:
   a student station having simulated automotive controls,
   a screen having a main viewing area and at least one distinct adjacent auxiliary viewing area, located beside said main viewing area, and
   means for projecting onto said main viewing area of said screen a forward looking recorded image and simultaneous projecting onto said auxiliary viewing area an independently and synchronously recorded rear looking image.

2. An automotive driver training system comprising, a student station having simulated automotive controls, a viewing screen having a main viewing area and at least one distinct adjacent auxiliary viewing area located beside said main viewing area and means for simultaneously projecting on said main viewing area and at least one auxiliary viewing area of said screen the synchronous recorded views an operator would see in a forward looking direction and in at least one rearward looking outside mirror, respectively.

3. The system claimed in claim 1, further characterized by said screen having two auxiliary viewing areas, located on each side of said main viewing area, and means for projecting onto said auxiliary areas independent and synchronous recorded rear looking images.

4. An automotive driver training system comprising, a student station having simulated automotive controls, a viewing screen having three distinct viewing areas arranged side by side, and means for simultaneously projecting on said three viewing areas of said screen the synchronous recorded views an operator would see in a forward looking direction and in two rearward looking outside mirrors.

* * * * *